United States Patent
Lin et al.

(10) Patent No.: US 11,828,547 B2
(45) Date of Patent: Nov. 28, 2023

(54) HEAT-DISSIPATING DEVICE

(71) Applicant: QISDA CORPORATION, Taoyuan (TW)

(72) Inventors: Chi-Cheng Lin, Taoyuan (TW); Po-Fu Wu, Taoyuan (TW); Hung-Jen Wei, Nantou County (TW)

(73) Assignee: Qisda Corporation, Taoyuan (TW)

( * ) Notice: Subject to any disclaimer, the term of this patent is extended or adjusted under 35 U.S.C. 154(b) by 25 days.

(21) Appl. No.: 17/189,260

(22) Filed: Mar. 2, 2021

(65) Prior Publication Data
US 2021/0285731 A1    Sep. 16, 2021

(30) Foreign Application Priority Data

Mar. 11, 2020  (CN) .......................... 202010167137.1

(51) Int. Cl.
*F28F 3/02* (2006.01)
*F28F 3/04* (2006.01)
*F28F 3/06* (2006.01)

(52) U.S. Cl.
CPC .............. *F28F 3/025* (2013.01); *F28F 3/048* (2013.01); *F28F 3/06* (2013.01); *F28F 2215/04* (2013.01)

(58) Field of Classification Search
CPC .... F28F 3/025; F28F 3/048; F28F 3/06; F28F 3/12; F28F 2215/04; G06F 1/20; F28D 2021/0029; H05K 7/20409; H05K 7/20418
USPC ......................................................... 165/185
See application file for complete search history.

(56) References Cited

U.S. PATENT DOCUMENTS

| | | | | |
|---|---|---|---|---|
| 6,216,343 B1* | 4/2001 | Leland | ................... | F28D 15/04 29/890.032 |
| 7,965,511 B2* | 6/2011 | Refai-Ahmed | ..... | F28D 15/0275 174/15.1 |
| 8,737,071 B2* | 5/2014 | Hao | ........................ | F28D 15/00 174/15.1 |
| 9,436,235 B2* | 9/2016 | Damaraju | ............. | H01L 23/427 |
| 10,483,190 B2* | 11/2019 | Lin | ...................... | H01L 21/4882 |
| 11,435,144 B2* | 9/2022 | Liu | ..................... | F28D 15/0275 |
| 2002/0056908 A1* | 5/2002 | Brownell | .............. | H01L 23/427 257/714 |
| 2005/0156013 A1* | 7/2005 | Bhatti | ..................... | F28F 3/025 156/60 |
| 2006/0157102 A1* | 7/2006 | Nakajima | ............... | F01N 5/025 136/204 |
| 2007/0272399 A1* | 11/2007 | Nitta | ..................... | F28D 15/046 165/185 |

(Continued)

FOREIGN PATENT DOCUMENTS

| | | |
|---|---|---|
| CN | 103229014 A | 7/2013 |
| CN | 209746197 U | 12/2019 |
| EP | 2159838 A2 * | 3/2010 ......... H01L 21/4882 |

*Primary Examiner* — Len Tran
*Assistant Examiner* — Gustavo A Hincapie Serna (57) ABSTRACT

A heat-dissipating device includes a casing and a heat dissipating fin set. The casing has a first hole structure. The heat dissipating fin set includes a protruding fin, a sheltering component and a bridging component. A hollow chamber of the protruding fin has a first opening and a second opening adjacent to each other. The first opening is connected to an inner space of the casing. The sheltering component is disposed on the protruding fin to shelter the second opening. The bridging component is connected to the protruding fin and fixed onto the first hole structure.

13 Claims, 6 Drawing Sheets

(56) References Cited

U.S. PATENT DOCUMENTS

| | | | | |
|---|---|---|---|---|
| 2011/0267771 A1* | 11/2011 | Cheng | ................... | G06F 1/20 |
| | | | | 361/679.54 |
| 2013/0068434 A1* | 3/2013 | Takano | ................... | F28F 3/025 |
| | | | | 165/170 |
| 2014/0020687 A1* | 1/2014 | Cullen | ................ | A61M 16/204 |
| | | | | 128/204.23 |
| 2016/0341492 A1* | 11/2016 | Watanabe | ............ | H01L 23/3677 |
| 2017/0341521 A1* | 11/2017 | Kaneko | ................. | B60L 3/003 |
| 2018/0040532 A1* | 2/2018 | Wu | ..................... | H01L 23/3732 |
| 2018/0252483 A1* | 9/2018 | Geng | ................. | H01L 23/3672 |
| 2019/0014690 A1* | 1/2019 | Miura | ................. | H01M 10/655 |
| 2019/0343021 A1* | 11/2019 | Zhang | ................. | H01L 21/4882 |
| 2019/0357388 A1* | 11/2019 | Sato | ................... | H05K 7/20163 |
| 2020/0025452 A1* | 1/2020 | Hidaka | .................... | F28F 3/06 |
| 2020/0378690 A1* | 12/2020 | Liu | ........................ | F28D 15/04 |
| 2021/0104450 A1* | 4/2021 | Zhong | ................. | H01L 23/427 |
| 2021/0280498 A1* | 9/2021 | Kang | ................. | H01L 23/3675 |
| 2022/0225515 A1* | 7/2022 | Koller | ..................... | H05K 5/04 |

\* cited by examiner

HEAT-DISSIPATING DEVICE

BACKGROUND OF THE INVENTION

1. Field of the Invention

The present invention relates to a heat-dissipating device, and more particularly, to a heat-dissipating device with preferred heat dissipating efficiency.

2. Description of the Prior Art

Figure 6:
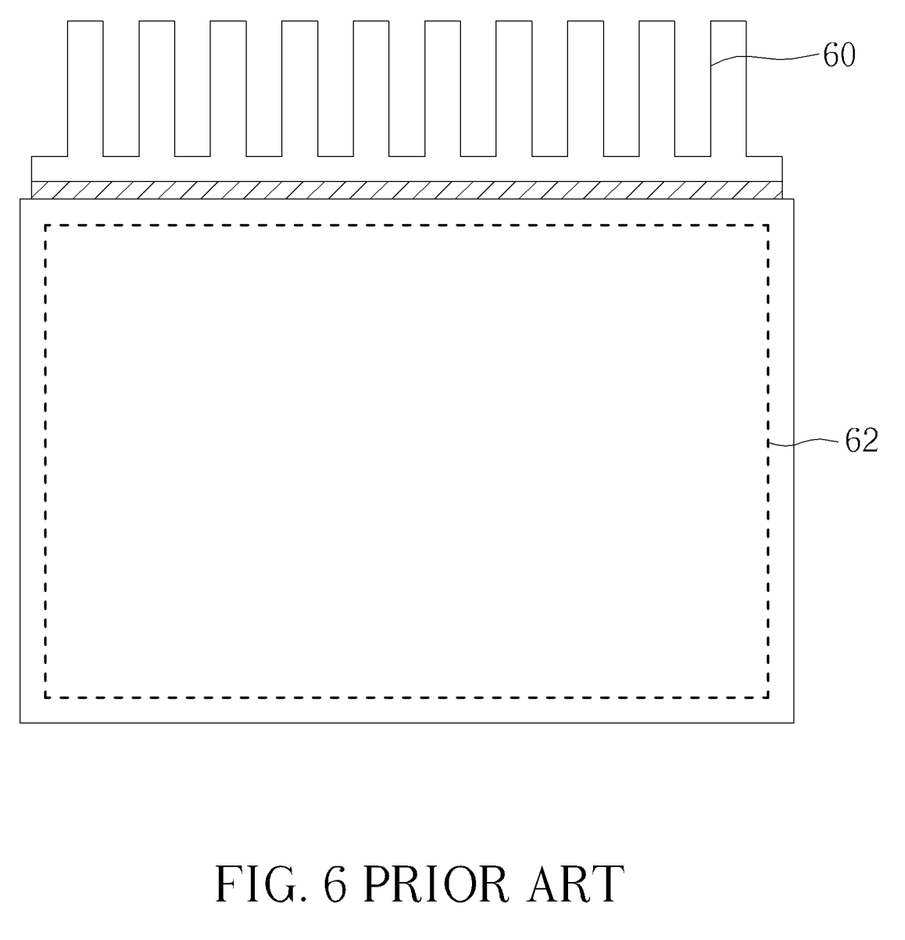
FIG. 6 is a diagram of a heat dissipating fin in the prior art.

Please refer to FIG. 6. FIG. 6 is a diagram of a heat dissipating fin 60 in the prior art. The heat dissipating fin 60 is disposed on an outer surface of a casing 62, and a heat generating component is disposed inside the casing 62. The heat generating component generates heat, and the heat is conducted to the heat dissipating fin 60 via a wall of the casing 62 for heat dissipation. The wall of the casing 62 is represented as a conventional heat dissipating path of the heat dissipating fin 60, which results in inefficient heat dissipation. Another solution may insert a heat conduction pipe into the casing, and the heat dissipating fin inside the heat conduction pipe dissipates the heat inside the casing; however, the foresaid solution has drawbacks of expensive product cost and heavy sizes, and cannot be applied for the portable electronic apparatus.

SUMMARY OF THE INVENTION

The present invention provides a heat-dissipating device with preferred heat dissipating efficiency for solving above drawbacks.

According to the claimed invention, a heat-dissipating device includes a casing and heat dissipating fin set. The casing has a first hole structure. The heat dissipating fin set includes a protruding fin, a sheltering component and a bridging component. A hollow chamber of the protruding fin has a first opening and a second opening adjacent to each other, and the first opening is connected to an inner space of the casing. The sheltering component is disposed on the protruding fin to shelter the second opening. The bridging component is connected to the protruding fin and fixed onto the first hole structure.

According to the claimed invention, the hollow chamber is located out of the inner space of the casing. The bridging component has a second hole structure and further has a first side and a second side opposite to each other. The first side faces the inner space. The protruding fin passes through the second hole structure and protrudes from the second side. The sheltering component is connected to the protruding fin and located on the second side.

According to the claimed invention, the protruding fin includes a top portion, a bottom portion, a first lateral portion and a second lateral portion. The first lateral portion is opposite to the second lateral portion. The top portion is connected with the first lateral portion and the second lateral portion to form the hollow chamber. The bottom portion is connected to the first lateral portion and the bridging component. The heat dissipating fin set further comprises a plurality of protruding fins, a bottom portion of one of the plurality protruding fins is connected to the bridging component or a bottom portion of another protruding fin.

According to the claimed invention, one part of the hollow chamber is located out of the inner space, and the other part of the hollow chamber is located inside the inner space. The protruding fin includes a first section and a second section connected to each other. The bridging component has a second hole structure and further has a first side and a second side opposite to each other. The first side faces the inner space, the first section is located on the first side, the second section passes through the second hole structure and located on the second side.

According to the claimed invention, the protruding fin includes a top portion, a bottom portion, a first lateral portion and a second lateral portion. The first lateral portion is opposite to the second lateral portion. The top portion is connected with the first lateral portion and the second lateral portion to form the hollow chamber. The bottom portion is connected to the second lateral portion and in contact with space outside the casing.

According to the claimed invention, the bridging component and the protruding fin are integrated monolithically, or the bridging component and the protruding fin are two independent structural units. The protruding fin is a straight structure, a curved structure or a waved structure. The first hole structure is formed on a wall of the casing, the heat dissipating fin set is disposed on the wall to seal the first hole structure.

The heat-dissipating device of the present invention can use the heat dissipating fin set as one wall of the casing. The wall of the casing can be wholly replaced by the protruding fins of the heat dissipating fin set, or the protruding fins of the heat dissipating fin set can be disposed on the specific region within the wall. The protruding fin can be the slab-type structure with several bending layers; one protruding fin with large sizes can be disposed on the casing to shelter or seal the first hole structure, or several protruding fins with small sizes can be assembled and disposed on the casing to shelter or seal the first hole structure. The protruding fin can increase the contacting dimension between the heat inside the casing and the low temperature airflow outside the heat-dissipating device; therefore, the protruding fin can be designed as the straight structure, the curved structure or the waved structure for enlarging the measure of surfaces. The heat inside the casing can flow toward the hollow chamber of the protruding fin, and the width of the protruding fin can be represented as the heat dissipating path for cooling the heat by the low temperature airflow outside the heat-dissipating device. The hollow chamber of the protruding fin can be completely located out of the casing, so the low temperature airflow can pass through space between the adjacent the protruding fins for heat dissipation; further, some part of the hollow chamber can be located inside the casing, and the low temperature airflow can flow through inside space of the casing for increasing the heat dissipating efficiency.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
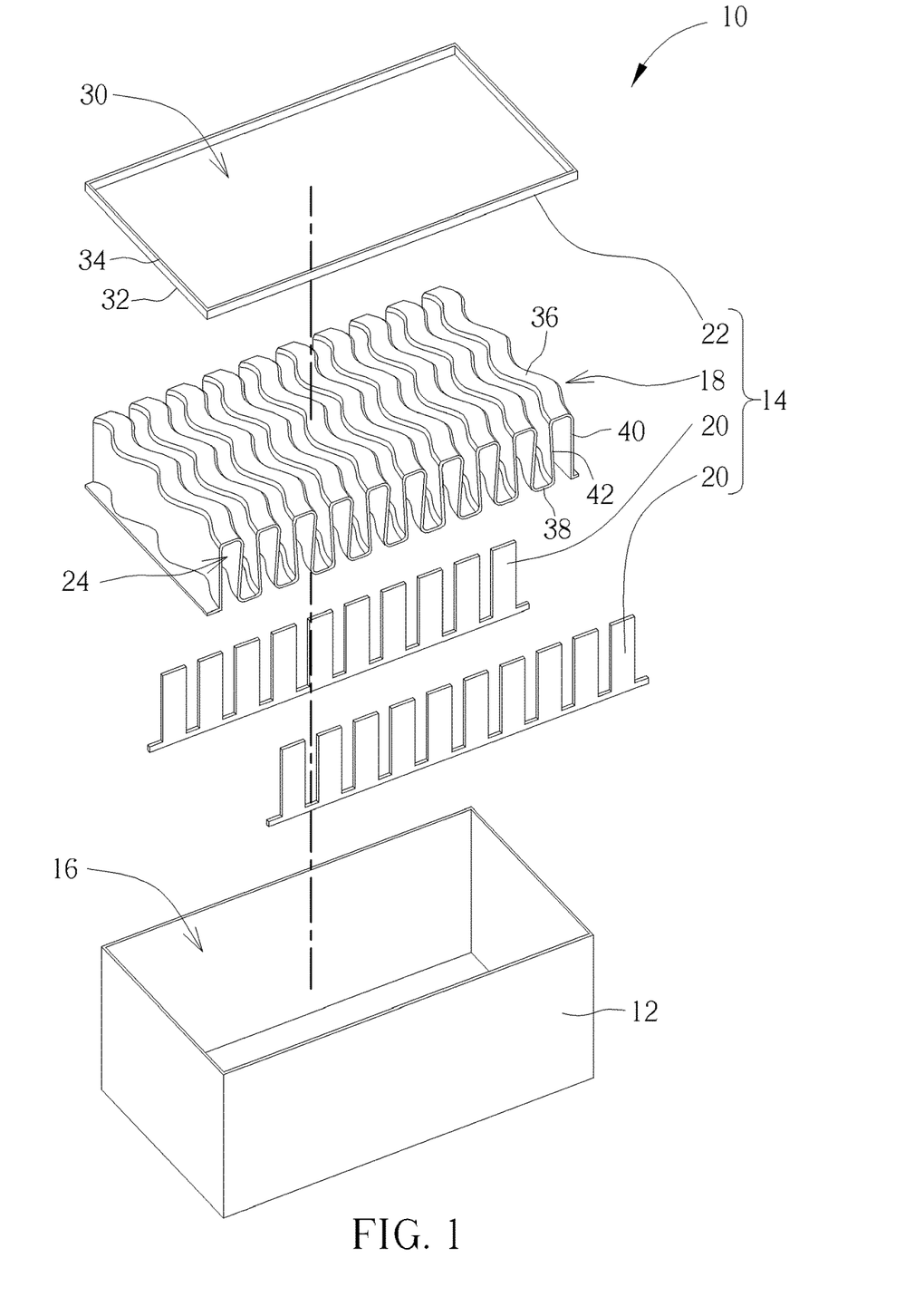
FIG. 1 is an exploded diagram of a heat-dissipating device according to an embodiment of the present invention.
Figure 2:
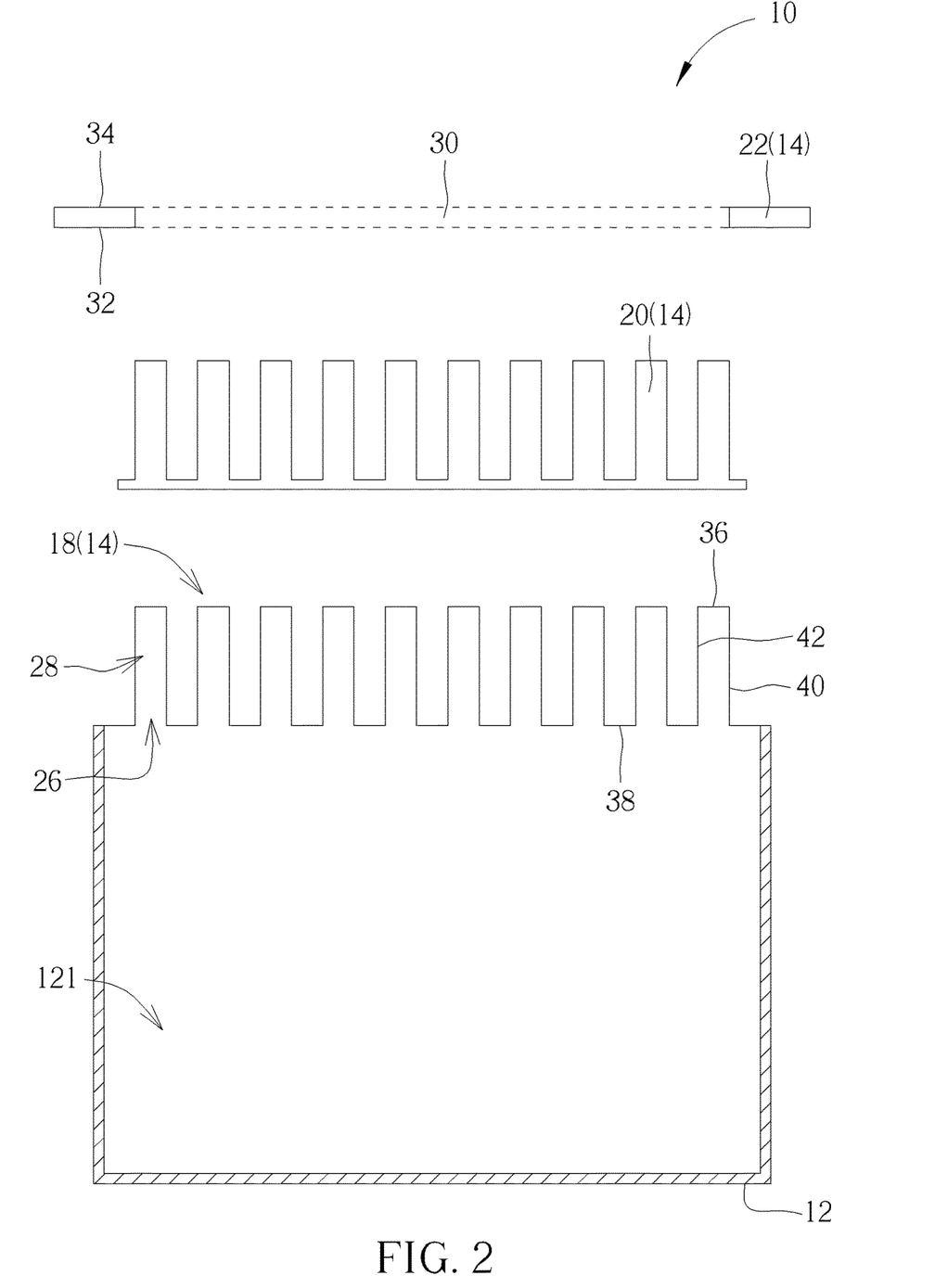
FIG. 2 is a lateral view of the heat-dissipating device according to the embodiment of the present invention.

Please refer to FIG. 1 and FIG. 2. FIG. 1 is an exploded diagram of a heat-dissipating device 10 according to an embodiment of the present invention. FIG. 2 is a lateral view of the heat-dissipating device 10 according to the embodiment of the present invention. The heat-dissipating device 10 can include a casing 12 and a heat dissipating fin set 14. The casing 12 can have a first hole structure 16, and a plurality of heat generating components can be disposed inside the casing 12. The heat dissipating fin set 14 can include a protruding fin 18, a sheltering component 20 and a bridging component 22. The protruding fin 18 can be a slab-type structure with multiple bending layers. An amount of the protruding fin 18 can be one or plural, which is not limited to the embodiment shown in FIG. 1 and FIG. 2. A hollow chamber 24 can be formed inside the slab-type structure of the protruding fin 18. The hollow chamber 24 can have a first opening 26 and a second opening 28. The first opening 26 is adjacent to and connected with the second opening 28.

The protruding fin 18 and the casing 12 are assembled to shelter or seal the first hole structure 16, and the first opening 26 of the protruding fin 18 can be connected to an inner space 121 of the casing 12. The sheltering component 20 can be disposed on a lateral side of the protruding fin 18 and used to shelter or seal the second opening 28 of the protruding fin 18. The bridging component 22 can be disposed around the protruding fin 18, and the first hole structure 16 on the casing 12 can be sealed up via the protruding fin 18 and the bridging component 22. The protruding fin 18 can be made by high heat-dissipating material. Thus, when heat inside the casing 12 flows toward the hollow chamber 24 of the protruding fin 18, the heat-dissipating device 10 can rapidly dissipate the heat due to a large contacting dimension between the heat and low temperature airflow outside the casing 12, so as to provide preferred heat dissipating efficiency.

In the embodiment, the bridging component 22 can be a rectangular structural unit with a hollow central part, which represents that the bridging component 22 can have a second hole structure 30. Each segment of the rectangular structural unit can have a first side 32 and a second side 34 opposite to each other. The first side 32 can face the inner space 121 of the casing 12. The second side 34 can be connected between the protruding fin 18 and the sheltering component 20. For example, the protruding fin 18 can pass through the second hole structure 30 and protrude from the second side 34, and the sheltering component 20 can be connected with the protruding fin 18 to shelter the second opening 28; meanwhile, the sheltering component 20 can be located on the second side 34. Because the hollow chamber 24 of the protruding fin 18 can be located out of the inner space 121 of the casing 12, an outer surface of the protruding fin 18 can be directly in contact with the low temperature airflow outside the heat-dissipating device 10, and an inner surface of the protruding fin 18 can be directly in contact with the heat inside the casing 12. A heat dissipating path of the heat-dissipating device 10 can be represented as a width of the protruding fin 18, which means the heat-dissipating device 10 has a minimal heat dissipating path.

Further, the heat dissipating fin set 14 can include one or more protruding fins 18, and each protruding fin 18 can include a top portion 36, a bottom portion 38, a first lateral portion 40 and a second lateral portion 42. The first lateral portion 40 can be opposite to the second lateral portion 42. The top portion 36 can be connected to upper parts of the first lateral portion 40 and the second lateral portion 42 to form the hollow chamber 24. The bottom portion 38 can be connected between the first lateral portion 40 and the bridging component 22, and/or between the second lateral portion 42 and the bottom portion 38 of the adjacent protruding fin 18. In the embodiment, the protruding fin 18 and the bridging component 22 can be two independent structural units, which depend on an actual demand. In some possible embodiment, the protruding fin 18 and the bridging component 22 may be integrated with each other monolithically; when the bridging component 22 is assembled with the casing 12, the protruding fin 18 can be simultaneously fixed to the first hole structure 16 for sealing the first hole structure 16.

Figure 3:
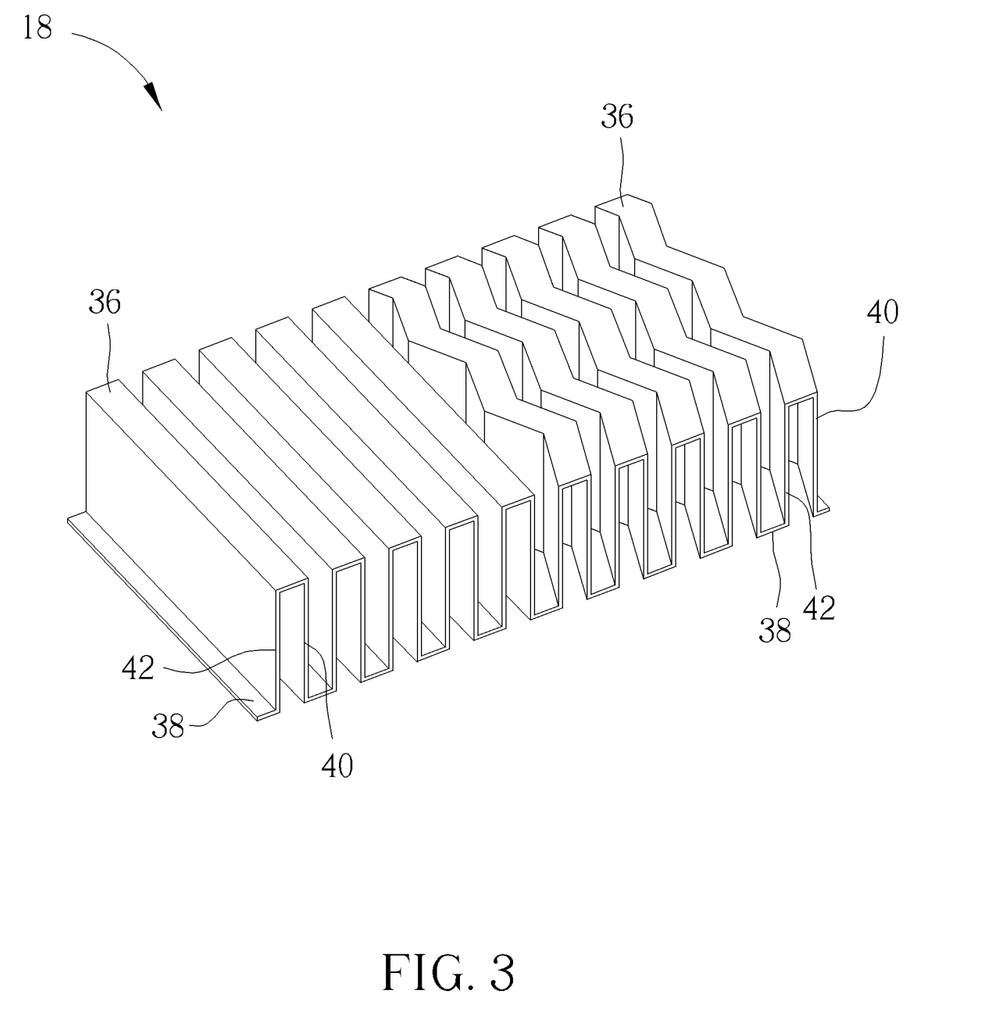
FIG. 3 is a diagram of a heat dissipating fin set and a protruding fin 1 according to another embodiment of the present invention.

Please refer to FIG. 3. FIG. 3 is a diagram of the heat dissipating fin set 14 and the protruding fin 18 according to another embodiment of the present invention. As shown in FIG. 1 and FIG. 3, the protruding fin 18 can be designed as a straight structure, a curved structure or a waved structure. The plurality of protruding fins 18 of the heat dissipating fin set 14 can have the same type (which can be shown in FIG. 1), or can have different types respectively (which can be shown in FIG. 3). The protruding fin 18 can dissipate the heat inside the casing 12, so that the curved structure or the waved structure of the protruding fin 18 can increase the contacting dimension between the heat and the low temperature airflow. The protruding fin 18 with the straight structure can have advantages of convenient fabrication and cheap cost. Thus, types of the protruding fin 18 can be designed according to the actual demand. Any structures capable of having the hollow chamber 24 protruded from the inner space 121 of the casing 12 for moving the heat inside the casing 12 out of the inner space 121, and further having the enlarged contacting dimension between the heat and the low temperature airflow can conform to a design scope of the protruding fin 18 of the present invention.

Figure 4:
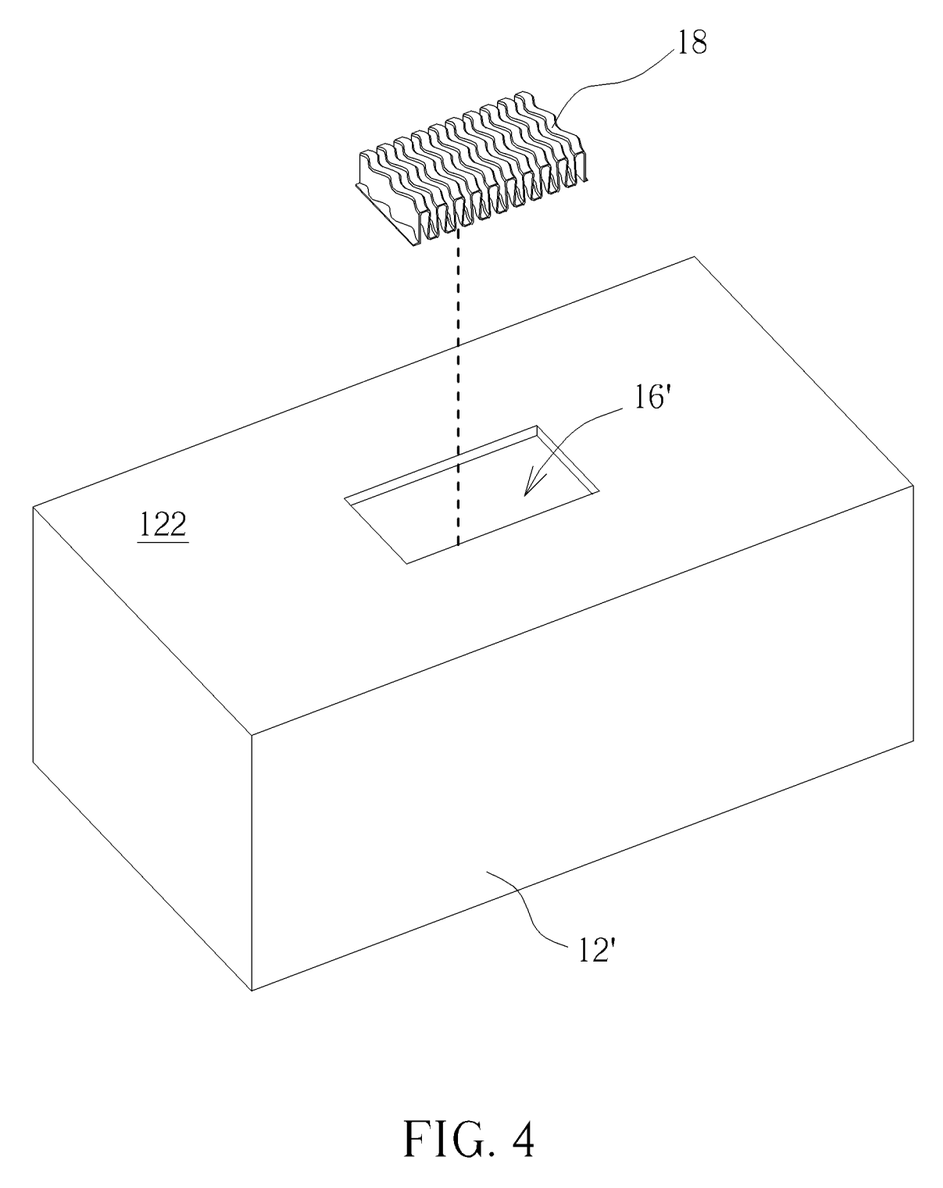
FIG. 4 is a diagram of a casing according to another embodiment of the present invention.

In the foresaid embodiment, the first hole structure 16 is formed on the whole wall of the casing 12; however, actual design of the first hole structure may have other options. Please refer to FIG. 4. FIG. 4 is a diagram of the casing 12' according to another embodiment of the present invention. The casing 12' can have the first hole structure 16' formed on the wall 122, and a size of the first hole structure 16' (such as a projected dimension) can be smaller than a size of the wall 122, which means only a part of the wall of the casing 12 is occupied by the first hole structure 16'. In this embodiment, the heat dissipating fin set 14 can be disposed on the part of the wall 122 to seal the first hole structure 16', instead of being one wall of the casing 12'. The heat dissipating fin set 14 can not only dissipate the heat inside the casing 12', but also prevent external dust from falling into the casing 12'. The first hole structure 16' may be disposed on a central region of the wall 122, or any region close to any side of the wall 122. As long as the first hole structure 16' aligns with the heat generating component inside the casing 12 or approaches a heat gathering area inside the casing 12, the first hole structure 16' can effectively dissipate the heat to achieve a design aim of the present invention.

Figure 5:
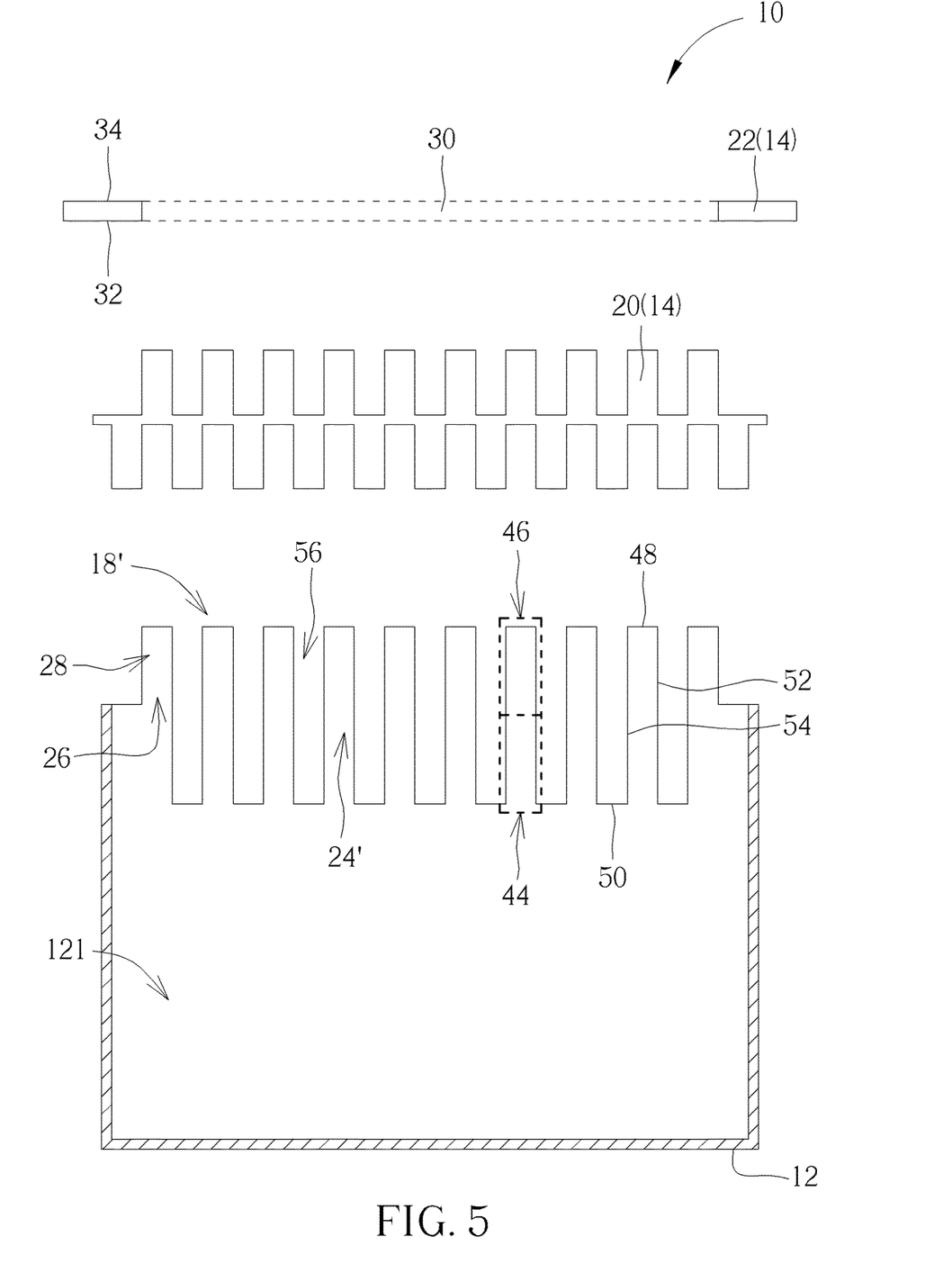
FIG. 5 is a lateral view of the heat-dissipating device according to another embodiment of the present invention.

Please refer to FIG. 5. FIG. 5 is a lateral view of the heat-dissipating device 10 according to another embodiment of the present invention. In this embodiment, elements having the same numerals as one of the above-mentioned embodiment have the same structures and functions, and a detailed description is omitted herein for simplicity. The heat-dissipating device 10 in this embodiment can insert the protruding fin 18' partly into the casing 12, so that an upper part of the hollow chamber 24' of the protruding fin 18' can be located out of the inner space 121, and a lower part of the hollow chamber 24' of the protruding fin 18' can be located inside the inner space 121. The protruding fin 18' (or the hollow chamber 24') can have a first section 44 and a second section 46 connected to each other. The first section 44 can be located on the first side 32, such as the lower part inside the inner space 121. The second section 46 can pass through the second hole structure 30 to protrude from the second side 34, such as the upper part out of the casing 12.

The protruding fin 18' can include a top portion 48, a bottom portion 50, a first lateral portion 52 and a second lateral portion 54. The first lateral portion 52 can be opposite to the second lateral portion 54. The top portion 48 can be connected to the first lateral portion 52 and the second lateral portion 54 to form the hollow chamber 24'. The bottom portion 50 can be connected between the second lateral portions 54 of the adjacent protruding fins 18', so as to form a space 56 in contact with outside of the casing 12. Thus, the heat inside the casing 12 can flow toward the hollow chamber 24', and be cooled by the low temperature airflow outside the heat-dissipating device 10 via the second section 46. The first section 44 can be set inside the casing 12, so that the low temperature airflow outside the heat-dissipating device 10 can flow through the space 56 between the adjacent protruding fins 18', and the heat inside the casing 12 can be dissipated or cooled by the low temperature airflow accordingly.

In conclusion, the heat-dissipating device of the present invention can use the heat dissipating fin set as one wall of the casing. The wall of the casing can be wholly replaced by the protruding fins of the heat dissipating fin set, or the protruding fins of the heat dissipating fin set can be disposed on the specific region within the wall. The protruding fin can be the slab-type structure with several bending layers; one protruding fin with large sizes can be disposed on the casing to shelter or seal the first hole structure, or several protruding fins with small sizes can be assembled and disposed on the casing to shelter or seal the first hole structure. The protruding fin can increase the contacting dimension between the heat inside the casing and the low temperature airflow outside the heat-dissipating device; therefore, the protruding fin can be designed as the straight structure, the curved structure or the waved structure for enlarging the measure of surfaces. The heat inside the casing can flow toward the hollow chamber of the protruding fin, and the width of the protruding fin can be represented as the heat dissipating path for cooling the heat by the low temperature airflow outside the heat-dissipating device. The hollow chamber of the protruding fin can be completely located out of the casing, so the low temperature airflow can pass through space between the adjacent the protruding fins for heat dissipation; further, some part of the hollow chamber can be located inside the casing, and the low temperature airflow can flow through inside space of the casing for increasing the heat dissipating efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A heat-dissipating device comprising:
   a casing, having a first hole structure; and
   a heat dissipating fin set, comprising:
      a protruding fin, a hollow chamber of the protruding fin having a first opening and a second opening adjacent to each other, the first opening being connected to an inner space of the casing, wherein at least a part of the hollow chamber is located out of the inner space of the casing;
      a sheltering component disposed on a lateral side of the protruding fin to seal the second opening; and
      a bridging component connected to the protruding fin and fixed onto a wall of the casing having the first hole structure;
   wherein the bridging component has a second hole structure and further has a first side and a second side opposite to each other, the first side faces the inner space, the protruding fin passes through the second hole structure and protrudes from the second side, the sheltering component is connected to the protruding fin and located on the second side.

2. The heat-dissipating device of claim 1, wherein the protruding fin comprises a top portion, a bottom portion, a first lateral portion and a second lateral portion, the first lateral portion is opposite to the second lateral portion, the top portion is connected with the first lateral portion and the second lateral portion to form the hollow chamber, the bottom portion is connected to the first lateral portion and the bridging component.

3. The heat-dissipating device of claim 1, wherein the heat dissipating fin set further comprises a plurality of protruding fins, a bottom portion of one of the plurality protruding fins is connected to the bridging component or a bottom portion of another protruding fin.

4. The heat-dissipating device of claim 1, wherein one part of the hollow chamber is located out of the inner space, and another part of the hollow chamber is located inside the inner space.

5. The heat-dissipating device of claim 4, wherein the protruding fin comprises a first section and a second section connected to each other, the bridging component has a second hole structure and further has a first side and a second side opposite to each other, the first side faces the inner space, the first section is located on the first side, the second section passes through the second hole structure and located on the second side.

6. The heat-dissipating device of claim 4, wherein the protruding fin comprises a top portion, a bottom portion, a first lateral portion and a second lateral portion, the first lateral portion is opposite to the second lateral portion, the top portion is connected with the first lateral portion and the second lateral portion to form the hollow chamber, the bottom portion is connected to the second lateral portion and in contact with space outside the casing.

7. The heat-dissipating device of claim 1, wherein the bridging component and the protruding fin are integrated monolithically, or the bridging component and the protruding fin are two independent structural units.

8. The heat-dissipating device of claim 1, wherein the protruding fin is a straight structure, a curved structure or a waved structure.

9. The heat-dissipating device of claim 1, wherein the first hole structure is formed on a wall of the casing, the heat dissipating fin set is disposed on the wall to seal the first hole structure.

10. A heat-dissipating device comprising:
a casing, having a first hole structure; and
a heat dissipating fin set, comprising:
- a protruding fin, a hollow chamber of the protruding fin having a first opening and a second opening adjacent to each other, the first opening being connected to an inner space of the casing, wherein one part of the hollow chamber is located out of the inner space, and another part of the hollow chamber is located inside the inner space;
- a sheltering component disposed on a lateral side of the protruding fin to seal the second opening; and
- a bridging component connected to the protruding fin and fixed onto a wall of the casing having the first hole structure.

11. The heat-dissipating device of claim 10, wherein the protruding fin comprises a first section and a second section connected to each other, the bridging component has a second hole structure and further has a first side and a second side opposite to each other, the first side faces the inner space, the first section is located on the first side, the second section passes through the second hole structure and located on the second side.

12. The heat-dissipating device of claim 10, wherein the protruding fin comprises a top portion, a bottom portion, a first lateral portion and a second lateral portion, the first lateral portion is opposite to the second lateral portion, the top portion is connected with the first lateral portion and the second lateral portion to form the hollow chamber, the bottom portion is connected to the second lateral portion and in contact with space outside the casing.

13. The heat-dissipating device of claim 10, wherein the first hole structure is formed on a wall of the casing, the heat dissipating fin set is disposed on the wall to seal the first hole structure.

\* \* \* \* \*